United States Patent [19]
Lee

[11] Patent Number: 5,906,255
[45] Date of Patent: May 25, 1999

[54] AUTOMATIC TRANSMISSION CLUTCH DRUM ASSEMBLY WITH WAVED RING SPRING

[75] Inventor: Edward Lee, Chesapeake City, Md.

[73] Assignee: Deltrans, Inc., Newark, Del.

[21] Appl. No.: 08/877,827

[22] Filed: Jun. 18, 1997

[51] Int. Cl.⁶ ...................................................... F16D 11/04
[52] U.S. Cl. .................................. 192/70.11; 192/85 AA; 192/89.22
[58] Field of Search ........................... 192/89.22, 85 AA, 192/70.11

[56] References Cited

U.S. PATENT DOCUMENTS

| | | | |
|---|---|---|---|
| 3,362,481 | 1/1968 | Steinhagen | 192/85 AA |
| 3,650,162 | 3/1972 | Leising et al. | 74/867 |
| 4,226,319 | 10/1980 | Euler et al. | 192/85 |
| 4,592,455 | 6/1986 | Bubak | 192/13 |
| 4,659,093 | 4/1987 | Maeda | 277/139 |
| 4,694,946 | 9/1987 | Pearch et al. | 192/85 AA |
| 4,958,753 | 9/1990 | Nogle et al. | 192/85 |
| 4,987,865 | 1/1991 | Schenkel | 123/193 |
| 5,087,055 | 2/1992 | Ono et al. | 277/139 |
| 5,129,661 | 7/1992 | Ono et al. | 277/141 |
| 5,445,258 | 8/1995 | Bigley et al. | 192/85 |

FOREIGN PATENT DOCUMENTS 07248035  9/1995  Japan .

OTHER PUBLICATIONS

Automatic Transmission Server's Group Techtran Manual for THM 400 (Undated).

Automatic Transmission Service Group Techtran Manual for Acura Integra 4 Sp Hyrdraulic (1987).

*Primary Examiner*—Charles A. Marmor
*Assistant Examiner*—Saúl J. Rodriguez
*Attorney, Agent, or Firm*—Connolly & Hutz

[57] ABSTRACT

In a motor vehicle transmission multiple-disc clutch assembly, a waved ring-shaped spring is provided within an annular groove formed in the clutch piston held within the clutch housing. The waved spring preferably is formed from spring steel and has five upwardly directed segments and five downwardly directed segments. When inserted in the annular groove and not flexed or compressed, a portion of the upwardly directed segments extends above the upper surface of the outer rim of the clutch piston by between about 0.025 to 0.040 inch. The waved spring opposes axial forces exerted on the clutch piston and the clutch pack (plurality of clutch plates) at a rate of 200 to 240 psi for the first 0.030 inch compression until it is substantially flattened with the upwardly directed segments to a height even with the outer rim of the clutch piston. The waved spring is free of radially extending projections or tabs and is movable with relation to the clutch piston.

20 Claims, 4 Drawing Sheets

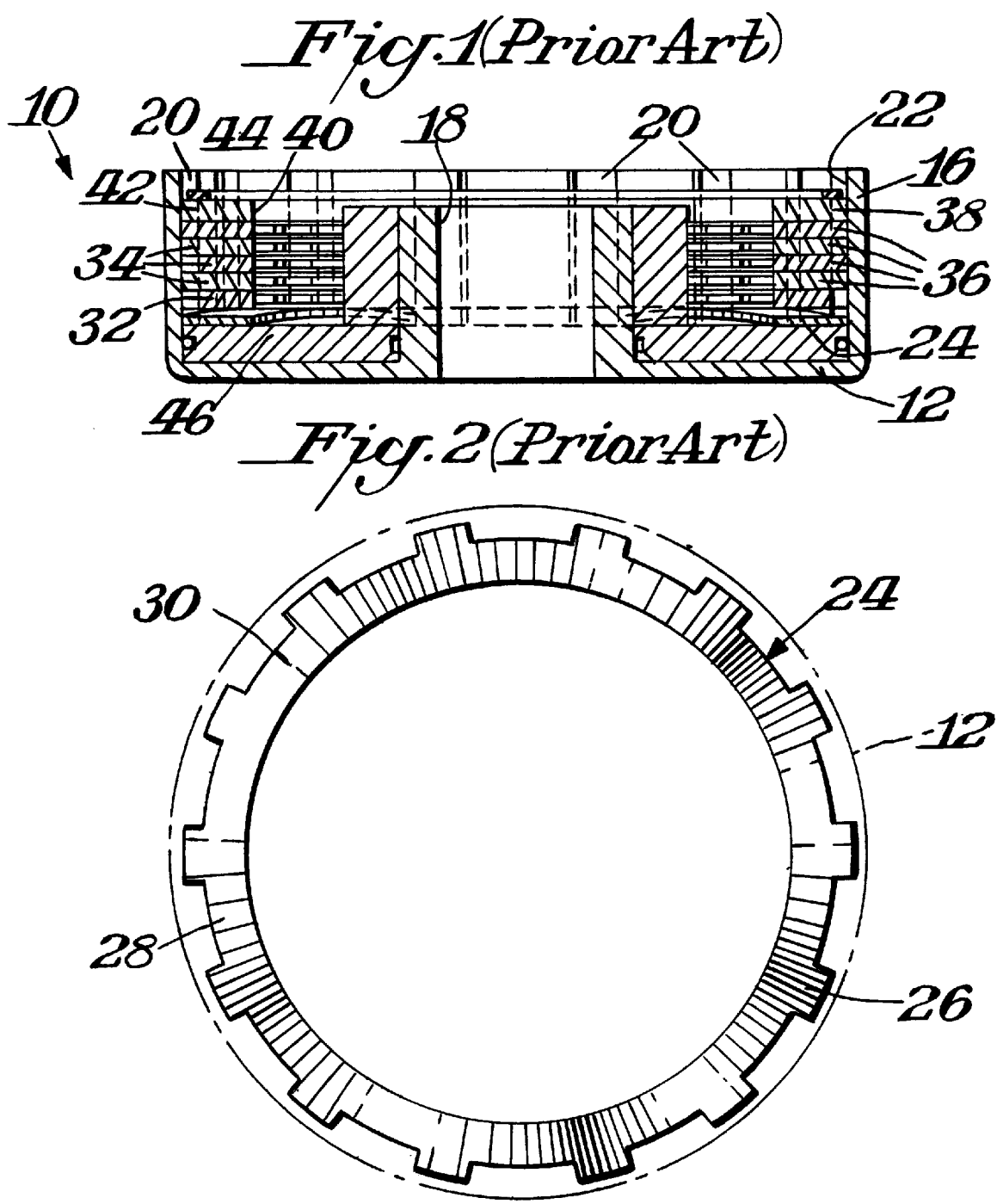

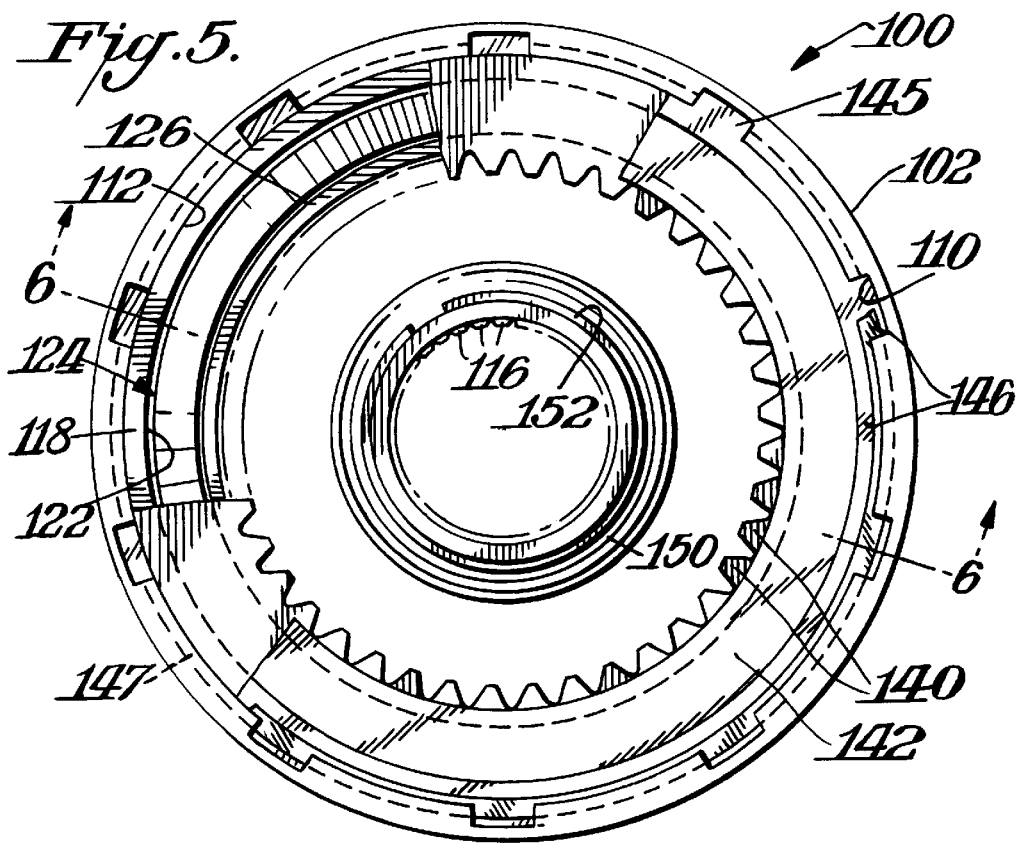
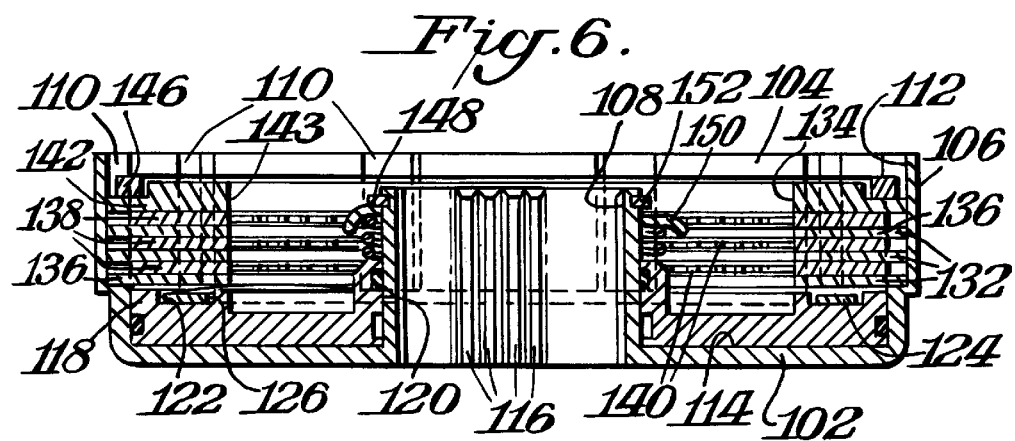
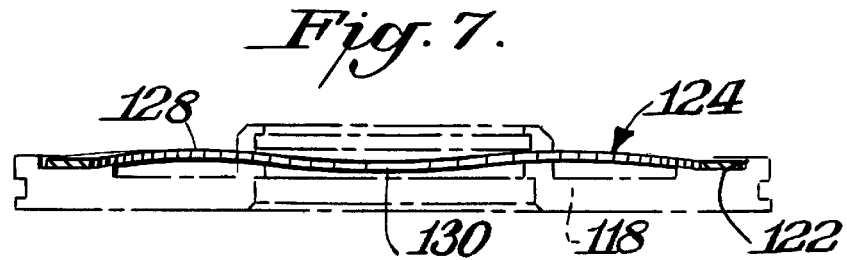

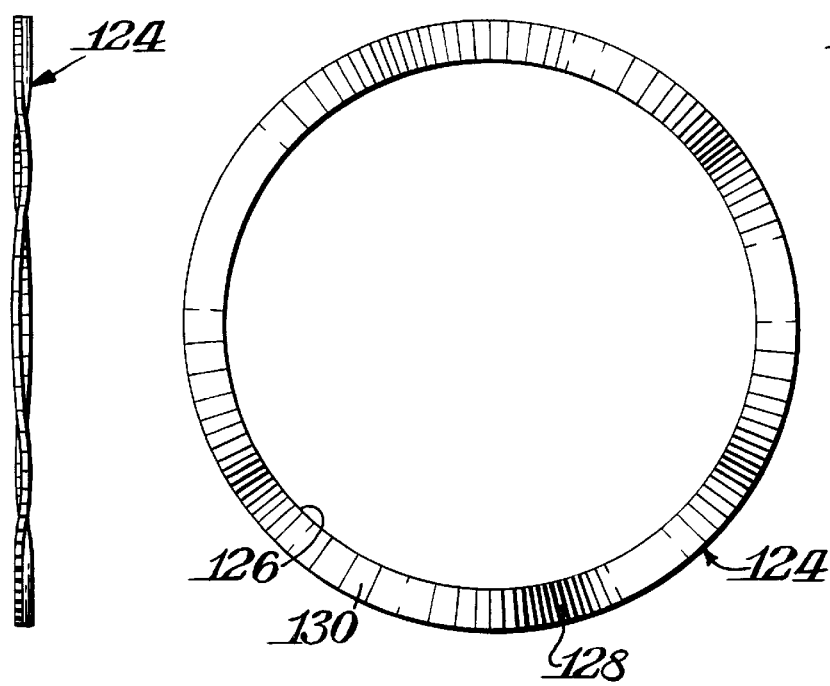
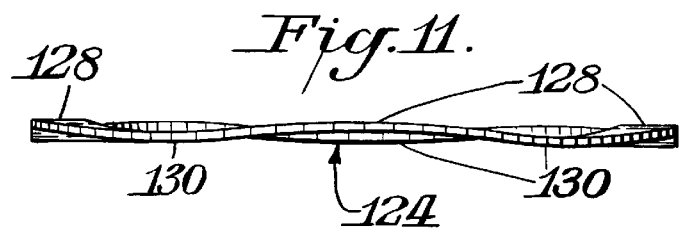

5,906,255

AUTOMATIC TRANSMISSION CLUTCH DRUM ASSEMBLY WITH WAVED RING SPRING

BACKGROUND OF THE INVENTION

A multiple-disc clutch uses a series of annularly shaped friction discs to transmit torque or apply braking force. The discs have internal teeth that are sized and shaped to mesh with splines on the clutch assembly hub. In turn, this hub is connected to a planetary gear train component so gearset members receive the desired braking or transfer force when the clutch is applied or released. The multi-disc clutch assembly is the means by which gears within the transmission are selectively engaged and disengaged from either the crankshaft or the transmission case.

Multiple-disc clutches have a large drum-shaped housing which holds all other clutch components, such as the cylinder, hub, clutch piston, piston return springs, seals, pressure plate, clutch pack and snap rings. The clutch pack consists of a series of clutch plates and composition plates, and a thicker plate known as the pressure plate or clutch backing plate. Sometimes friction discs are sandwiched between the clutch plates and the pressure plate.

The clutch plates have tabs extending radially outwardly around their outside diameter to mate with the axially aligned channels or grooves formed in the inner rim of the clutch drum. When the tabs are held within the grooves, they prevent substantial relative movement between the clutch plates and the clutch drum. Clutch plates must have perfectly flat outer surfaces. They are specifically machined to promote a coefficient of friction to help transmit engine torque.

The pressure plate or clutch backing plate has tabs extending radially outwardly around the outside diameter also to mate with the channels in the clutch drum. The pressure plate is usually held in place with a large snap ring. The stroking piston forces the engaging clutch pack against the fixed pressure plate. Because the pressure plate cannot move or deflect, it provides the reaction to the engaging clutch pack.

Examples of prior art multi-disc clutch assemblies are shown in the following patents: U.S. Pat. No. 4,958,753; U.S. Pat. No. 4,592,455; and U.S. Pat. No. 4,226,319.

In addition, two examples of prior art multi-disc clutch assemblies are shown in FIGS. 1–4. In the prior art GENERAL MOTORS® THM 400 automatic transmission, illustrated in attached FIGS. 1 and 2, a clutch piston 46 is provided between the inner surface of the clutch drum housing 12 and the composition plates 32 and flat steel clutch plates 34 of the clutch pack in the clutch drum assembly 10. A waved steel ring 24 is provided between the clutch piston 46 and the bottom clutch plate 34 or composition plate 32. The ring 24 defines an axial opening that fits around the inner rim 18 of the clutch drum housing 12 and has radially outwardly extending tabs or projections 26 that fit within the axial grooves 20 defined in the inner surface of the outer rim 16 of the clutch drum housing 12. The waved steel ring 24 further defines axially downwardly extending portions 28 and axially upwardly extending portions 30. Clutch backing plate 38 (sometimes also called the pressure plate) nests against one of the clutch plates 34 and is held in place by snap ring 44. Clutch backing plate 38 defines an axial opening that fits around the inner rim 18 of the clutch drum housing 12, and the plate 38 has radially outwardly extending tabs or projections 42 that fit within the axial grooves 20 defined in the inner surface of the outer rim 16 of the clutch drum housing 12.

When an axially directed pressure of a sufficient force (due to the stroking piston) is applied against the waved steel ring 24, the downward and upward projecting portions 28, 30 of the ring 24 may be flattened out to cause a greater frictional engagement between the surfaces of the ring 24 and the surface of the adjacent composition plate 32 or clutch plate 34 and the surface of the clutch piston 46. The reacting forces of the ring 24 cause the clutch to apply more gradually to prevent a bump or lurch at the end of a gear shift. Because the tabs 26 of the waved steel ring 24 are held within the axially extending grooves 20 of the clutch drum housing, the waved steel ring 24 cannot rotate when subjected to the axial force in combination with the rotational frictional forces.

Another prior art clutch arrangement is shown in FIGS. 3 and 4. The ACURA® INTEGRA® 4Sp Hydraulic transmission includes a clutch drum assembly 50 having a clutch housing or drum 52 defining an annular open cavity 54 between an outer rim 56 and an inner rim 58. Axially extending grooves 60, sometimes called clutch plate channels, are formed in the inner surface 62 of the outer rim 56. A clutch piston 66 is held within the open cavity defined by the clutch housing 52. The clutch piston 66 has an axial opening 68 that fits around the inner rim 58 of the clutch housing 52, and has an annular groove 70 disposed in its upper surface. A spring washer 64 having an inner edge, an outer edge, an upper surface and a lower surface, is held within the annular groove 70 with a portion of its lower surface contacting the clutch piston. One clutch plate 72 of a series of clutch and composition plates 72, 76 forming the clutch pack abuts against a portion of the upper surface of the spring washer 64. Each of the clutch plates 72 has radially outwardly extending tabs 74 that fit within the axially extending grooves 60 in the inner surface 62 of the outer rim 56 of the clutch housing 52. The composition plates 76 have radially inwardly extending teeth 78 that selectively mate with splines provided on the transmission shaft (not shown). A clutch backing plate 80 (sometimes called a pressure plate) nests adjacent to the last clutch plate 72 of the clutch pack, and is held in place by snap ring 90. The clutch backing plate 80 has an annular open cavity 82 that fits around the inner rim 58 of the clutch housing 52, and has radially outwardly extending tabs 84 that fit within the axially extending grooves 60 in the inner surface of the outer rim 56 of the clutch housing 52.

The spring washer 64 is inwardly dished so that its upper surface slopes downwardly from its outer edge 65 to its inner edge 63. Typically, the spring washer 64 is inserted into the annular groove 70 so that the upper surface is adjacent to a clutch plate 72 and the inner edge and a portion of the lower surface contact the annular groove 70. The spring washer 64 opposes axial forces exerted on the clutch piston 66 (due to the stroking piston). When those forces are high enough, however, the spring washer 64 may be flattened out within the annular groove 70 of the clutch piston 66. It has been found that frictional contact between outer edge 65 of the spring washer 64 and the facing surface of the adjacent clutch plate 72 cuts a groove or otherwise causes excessive wear in the adjacent clutch plate 72. This wear causes a small loss of the axial spring force applied to the clutch plates, which in turn causes undesirable slippage between the clutch piston and clutch pack, eventually leading to clutch failure.

Alternately, the spring washer 64 may fit within groove 70 in an inverted position such that the outer edge 65 and a portion of the nominal lower surface contact the annular groove 70 and the inner edge 63 and nominal upper surface contact the adjacent clutch plate 72. In this configuration, frictional contact between the inner edge 63 of the spring washer 64 and the facing surface of the adjacent clutch plate 72 cuts a groove or wears the surface of the clutch plate 72.

An object of the present invention is to provide a clutch assembly in which the proper axial forces are exerted on the clutch plates and clutch piston without causing undesirable excessive wear on the surfaces of the clutch plates. A further object of the invention is to provide a waved ring spring formed without mating tabs or projections that is held within the clutch piston in the clutch housing without restriction on its rotational movement within the clutch housing.

SUMMARY OF THE INVENTION

The invention improves existing multiple-disc clutch piston assemblies that comprise a clutch housing or drum that holds a clutch piston, a clutch pack usually consisting of a plurality of clutch plates and composition plates, a clutch backing plate, and a snap ring to hold the clutch backing plate in place. In the assembly, the clutch piston is positioned within the clutch housing and is adjacent to a clutch plate in the clutch pack. The improvement comprises inserting a waved ring spring into an annular groove formed in an upper surface of the upper face of the clutch piston.

The waved spring has a plurality of axially upwardly directed segments and a plurality of axially downwardly directed segments, wherein a portion of at least one of the upwardly directed segments protrudes above the upper surface of the outer rim of the clutch piston. The protruding portion or portions of the spring contact a flat friction surface of the adjacent clutch plate. The spring opposes axial forces applied to the clutch piston and clutch pack. Once those forces exceed the spring force, the upwardly directed protruding segments are forced downward to a height that is approximately even with the height of the upper surface of the outer rim of the clutch piston.

The preferred waved ring spring is formed from spring steel that is 0.070 to 0.080 inch thick. The spring has dimensions that will permit it to be held within the annular groove of the clutch piston without jamming or binding to the clutch piston. Preferably, the waved ring spring has an inner diameter of about 3⅝" and an outer diameter of about 4³⁄₁₆". The ring spring has a static (uncompressed) height so that a portion of the upwardly directed segments protrudes above the upper surface of the clutch piston. Preferably the static height is between 0.100 to 0.125 inch, most preferably 0.110 to 0.115 inch. The preferred ring spring has five axially upwardly directed segments and five axially downwardly directed segments, preferably in a symmetrical or regular sinusoidal pattern of upward segments separated from downward segments as seen going around the ring. Alternative constructions with varying numbers of upward segments as compared to downward segments are within the scope of this invention. The ring spring has a compression force rate of between about 200 and 240 psi to compress the first 0.030 inch.

While the waved ring spring preferably is held within an annular groove in the clutch piston, alternatively the spring might be placed within a groove formed in the pocket pressure plate. In addition, very soft shifts would result when more than one waved ring spring according to the invention are incorporated into the clutch assembly.

BRIEF DESCRIPTION OF THE DRAWINGS

FIG. 1 is a cross-sectional view in side elevation showing a prior art clutch drum assembly for an automatic transmission;

FIG. 2 is a top plan view of a prior art waved ring spring with radially extending tabs held within a clutch housing (shown in phantom outline);

FIG. 5 is a top plan view partially cut away showing a clutch drum assembly for an automatic transmission according to the invention;

FIG. 6 is a cross-sectional side elevation view taken along line 6—6 of FIG. 5;

FIG. 7 is a side elevation view of the waved ring spring fitted into the clutch piston (shown in phantom outline);

FIG. 8 is a top plan view of the waved ring spring;

FIG. 9 is a left side elevation view of the waved ring spring of FIG. 8;

FIG. 10 is a right side elevation view of the waved ring spring of FIGS. 8 and 9; and FIG. 11 is a front elevation view of the waved ring spring of FIGS. 8, 9 and 10.

DESCRIPTION OF THE PREFERRED EMBODIMENTS

Figure 3:
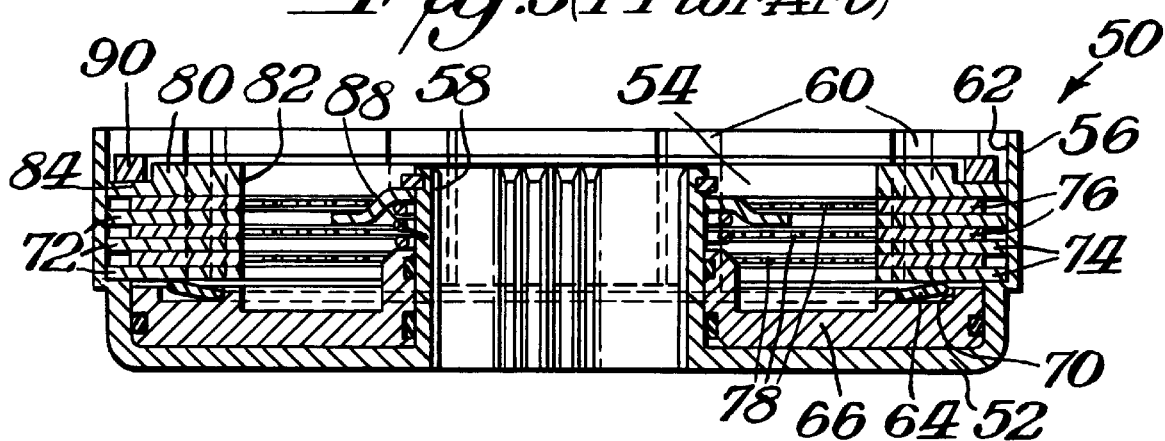
FIG. 3 is a cross-sectional view in side elevation showing another prior art clutch drum assembly for an automatic transmission.
Figure 4:
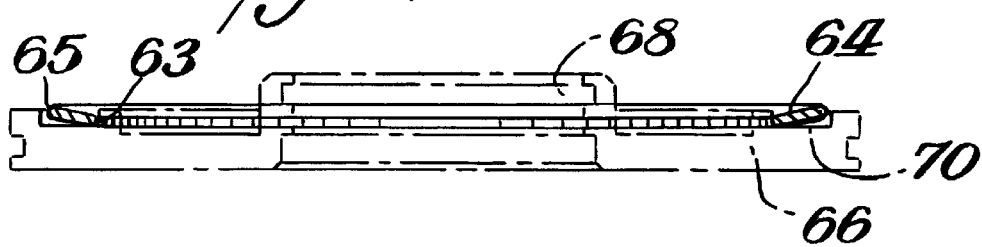
FIG. 4 is a side elevation view of a prior art spring washer fitted into the clutch piston (shown in phantom outline)

Referring to FIGS. 5 and 6, a clutch drum assembly 100 according to the invention includes a clutch housing or drum 102 defining an annular open cavity 104 between an upstanding outer rim 106 and an upstanding inner rim 108. Axially extending grooves 110, sometimes called clutch plate channels, are formed in the inner surface 112 of the outer rim 106 of the housing 102. The clutch housing 102 has a substantially flat inner base surface 114. Axially extending splines or teeth 116 are formed on one surface of the upstanding inner rim 108.

A clutch piston 118 is held within the clutch housing 102. The axially aligned open portion 120 of the annularly shaped clutch piston 118 fits around the upstanding inner rim 108 of the housing 102. An upper surface of the clutch piston 118 defines an annular groove 122.

A waved ring spring 124 according to the invention is held within the annular groove 122 of the clutch piston 118. The waved ring spring 124 has an annular open cavity 126 and has five axially upwardly extending segments 128 and five axially downwardly extending segments 130. When the spring 124 is held within the annular groove 122 in the clutch piston 118 and when it is not subjected to axially applied forces, the upwardly extending segments 128 protrude above the upper surface of the rim of the clutch piston 118 by about 0.030 inch. Until a sufficient axial force is applied to counteract the spring force and flatten the spring 124, the waved spring 124 separates the flat frictional surface of the adjacent clutch plate 132 from the upper surfaces of the clutch piston 118.

The waved ring spring 124 if formed from spring steel that has a thickness of between about 0.070 and 0.080 inch, preferably 0.070 inch. The spring preferably has a static (uncompressed) height, measured from the outer surface of a downwardly extending projection to the outer surface of an upwardly extending projection of 0.100 to 0.125 inch, most preferably 0.110 to 0.115 inch. The waved ring spring 124 fits within the annular groove 122, but is movable with relation to the clutch piston 118. Axial forces acting on the spring 124 compress the spring at a rate of 200 to 240 psi for the first 0.030 inch of compression.

The clutch pack, formed of a plurality of clutch plates 132 and a plurality of composition plates 138, is positioned within the clutch housing 102 adjacent to an upper surface of the clutch piston 118 and the upper surface defined by the axially upwardly projecting segments or portions 128 of the waved ring spring 124. The clutch plates 132 have an annular shape with an annular open cavity 134 at the inner diameter and a plurality of radially outwardly extending tabs or projections 136 at the outer diameter. The annular open cavity 134 fits around the inner rim 108 of the clutch housing 102 with the inner diameter spaced apart from the surface of the inner rim 108. The tabs 136 fit within the axially extending grooves 110 in the inner surface 112 of the outer rim 106 of the clutch housing 102. The tabs 136 so held within the grooves 110 prevent relative movement between the clutch plates 132 and the clutch housing 102. The composition plates 138 are positioned between the clutch plates 132. Each composition plate 138 has an annular shape with an annular open cavity 139 at the inner diameter from which extends a plurality of radially inwardly extending teeth 140 that mate with splines on a shaft (not shown). The composition plates 138 fit within the housing 102 with the inner diameter around the inner rim 108 of the housing 102 with the teeth 140 spaced apart from the inner surface of the inner rim 108. The flat upper and lower surfaces of the composition plates 138 are held in frictional contact with the surfaces of adjacent clutch plates 132. The composition plates 138 are rotationally movable with relation to the clutch plates 132 and clutch housing 102.

Clutch backing plate 142 holds the clutch pack in place within the clutch housing 102. The clutch backing plate 142 has an annular shape with an open axial cavity 143 at its inner diameter that fits around the inner rim 108, but is spaced apart from the inner surface of the inner rim 108. Radially outwardly extending tabs 145 project from the outer diameter of the clutch backing plate 142. The tabs 145 fit within the axial grooves 110 formed within the inner surface 112 of the outer rim 106 of the clutch housing 102. The tabs 145 prevent relative movement between the clutch backing plate 142 and the clutch drum housing 102. In addition, the clutch backing plate 142 is held in place by snap ring 146. The snap ring 146 is held or retained within an annular groove 147 formed around the inner surface 112 of the outer rim 106 of the clutch drum housing 102.

Coil spring 148 acts on clutch piston 118, holding clutch piston 118 in place with relation to clutch housing 102. Coil spring 148 is placed around the inner rim 108 of the clutch drum housing 102, and is held in position by the spring retainer 150 and snap ring 152.

The invention has been illustrated as an improvement to existing ACURA® INTEGRA® 4Sp Hydraulic transmissions. As will be readily apparent to those skilled in the art, the invention may be used in other specific forms and in other transmissions without departing from its spirit or essential characteristics. The present embodiments are illustrative and not restrictive. The scope of the invention is indicated by the following claims.

I claim:

1. In a vehicle transmission multiple disc clutch assembly having a clutch drum housing defining an axis and having an outer rim with an inner surface defining axially extending grooves, a clutch piston within the housing, said clutch piston defining an axis and having an upper surface defining an annular groove, a plurality of clutch plates adjacent to the upper surface of the clutch piston, and a clutch backing plate adjacent to the plurality of clutch plates, the improvement comprising:

a waved spring movably fitted within the annular groove in the clutch piston, said waved spring forming a continuous ring or annulus and defining an axis and a median reference plane perpendicular to the axis and having a plurality of axially upwardly directed segments in relation to the median reference plane and a plurality of axially downwardly directed segments in relation to the median reference plane, wherein when the spring is fitted within the groove but is not flexed or compressed, a portion of the axially upwardly directed segments extends above an upper surface of the clutch piston and a portion of the axially downwardly directed segments contacts a lower surface of the annular groove, and when the spring is flexed or compressed due to an applied axially directed force, a portion of the axially upwardly directed segments frictionally contacts a facing surface of an adjacent clutch plate to reduce relative rotation about the axis of the clutch piston between the clutch piston and the adjacent clutch plate.

2. The multiple-disc assembly of claim 1, wherein the waved spring is formed with five axially upwardly directed segments.

3. The multiple-disc assembly of claim 1, wherein the waved ring spring is formed with five axially downwardly directed segments.

4. The multiple-disc assembly of claim 1, wherein the waved spring is formed from spring steel with a thickness of between about 0.070 to 0.080 inch.

5. The multiple-disc assembly of claim 1, wherein at least one of the axially upwardly directed segments of the waved spring extends above an upper surface of an outer rim of the clutch piston by between about 0.025 to 0.040 inch when the spring is not axially flexed or compressed.

6. The multiple-disc assembly of claim 1, wherein the axially upwardly directed segments of the waved spring extend above an upper surface of the outer rim of the clutch piston by about 0.030 inch when the spring is not axially flexed or compressed.

7. The multiple-disc assembly of claim 1, wherein the waved spring compresses about 0.030 inch in the axial direction when subjected to an axial compression force of between about 200 to 240 psi.

8. The multiple-disc assembly of claim 1, wherein the waved spring is free of radially outwardly extending tabs or projections.

9. The multiple-disc assembly of claim 1, wherein the waved spring is free of radially inwardly extending teeth or projections.

10. The multiple-disc assembly of claim 1, further comprising a pocket pressure plate defining a groove and wherein the waved spring fits within the groove in the pocket pressure plate.

11. A method for preventing excessive wear of clutch plates in a vehicle transmission multiple-disc clutch assembly having a clutch drum housing and defining an axis and having an outer rim with an inner surface defining axially extending grooves, a clutch piston within the housing, said clutch piston defining an axis and having an upper surface defining an annular groove, a plurality of clutch plates adjacent to the upper surface of the clutch piston, and a clutch backing plate adjacent to the plurality of clutch plates, the improvement comprising:

inserting a waved spring into the annular groove in the clutch piston, said waved spring forming a continuous ring or annulus and defining an axis and a median reference plane perpendicular to the axis and having a plurality of axially upwardly directed segments in relation to the median reference plane and a plurality of axially downwardly directed segments in relation to the median reference plane, wherein when the spring is fitted within the groove but is not axially flexed or compressed, a portion of the axially upwardly directed segments extends above an upper surface of the clutch piston and a portion of the axially downwardly directed segments contacts a lower surface of the annular groove, and when the spring is flexed or compressed due to an applied axially directed force, a portion of the axially upwardly directed segments frictionally contacts a facing surface of an adjacent clutch plate to reduce relative rotation about the axis of the clutch piston between the clutch piston and the adjacent clutch plate.

12. The method of claim 11, wherein the waved spring is formed with five axially upwardly directed segments.

13. The method of claim 11, wherein the waved ring spring is formed with five axially downwardly directed segments.

14. The method of claim 11, wherein the waved spring is formed from spring steel with a thickness of between about 0.070 to 0.080 inch.

15. The method of claim 11, wherein at least one of the axially upwardly directed segments of the waved spring extends above an upper surface of an outer rim of the clutch piston by between about 0.025 to 0.040 inch when the spring is not axially flexed or compressed.

16. The method of claim 11, wherein the upwardly directed segments of the waved spring extend above an upper surface of an outer rim of the clutch piston by about 0.030 inch when the spring is not axially flexed or compressed.

17. The method of claim 11, wherein the waved spring is free of radially outwardly extending tabs or projections.

18. The method of claim 11, wherein the waved spring is free of radially inwardly extending teeth or projections.

19. The method of claim 11, wherein the waved spring compresses about 0.030 inch in the axial direction when subjected to an axial compression force of between about 200 to 240 psi.

20. The method of claim 11, wherein a pocket pressure plate defining a groove is provided and wherein the waved spring fits within the groove in the pocket pressure plate.

* * * * *